US008542303B2

(12) United States Patent
Shiohara (10) Patent No.: US 8,542,303 B2
(45) Date of Patent: *Sep. 24, 2013

(54) DIGITAL CAMERA HAVING A DISPLAY MENU USED TO SELECT EITHER COLOR PHOTOGRAPHING OPERATION OR A BLACK/WHITE PHOTOGRAPHING OPERATION

(75) Inventor: Ryuichi Shiohara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 104 days.

This patent is subject to a terminal disclaimer.

(21) Appl. No.: 12/960,063

(22) Filed: Dec. 3, 2010

(65) Prior Publication Data

US 2011/0074990 A1    Mar. 31, 2011

Related U.S. Application Data

(63) Continuation of application No. 11/076,026, filed on Mar. 10, 2005, now Pat. No. 7,864,234.

(30) Foreign Application Priority Data

Mar. 10, 2004  (JP) ................................. 2004-067916

(51) Int. Cl.
 *H04N 3/14* (2006.01)
 *H04N 5/225* (2006.01)
 *H04N 5/222* (2006.01)

(52) U.S. Cl.
 USPC ....................... 348/273; 348/360; 348/333.02

(58) Field of Classification Search
 None
 See application file for complete search history.

(56) References Cited

U.S. PATENT DOCUMENTS

| 6,483,540 | B1 * | 11/2002 | Akasawa et al. ............. 348/239 |
| 6,728,483 | B1 | 4/2004 | Smart et al. |
| 6,803,949 | B1 | 10/2004 | Kitagawa |
| 7,057,654 | B2 | 6/2006 | Roddy et al. |
| 7,295,231 | B1 | 11/2007 | Kaku |
| 7,551,218 | B2 * | 6/2009 | Sasagawa et al. ........ 348/333.04 |
| 7,864,234 | B2 * | 1/2011 | Shiohara ....................... 348/273 |
| 2002/0105589 | A1 | 8/2002 | Brandenberger et al. |
| 2003/0081954 | A1 | 5/2003 | Nikawa et al. |
| 2003/0142221 | A1 | 7/2003 | Takakuwa |
| 2006/0245646 | A1 * | 11/2006 | Ishiga ........................... 382/167 |

FOREIGN PATENT DOCUMENTS

| JP | 05-260510 A | 10/1993 |
| JP | 2003-244486 A | 8/2003 |
| JP | 2003-244708 A | 8/2003 |

* cited by examiner

*Primary Examiner* — Luong T Nguyen
(74) *Attorney, Agent, or Firm* — Sughrue Mion, PLLC (57) ABSTRACT

A digital camera includes: an imaging unit that photoelectrically converts light to output a color image; a selecting unit that selects any one identifier from identifiers which are colored in different colors from each other; and a black/white image producing unit that produces a black/white image by weighting gradation values of respective colors for each of pixels of the output color image and adding the weighted gradation values to each other. When the light entered to the imaging unit is entered to a color filter having a color equal to a color of the selected identifier, a correlation between a light amount of light having a wavelength which penetrates the color filer and a light amount of the entered light becomes stronger than a correlation between a light amount of light having a wavelength which is absorbed by the color filter and the light amount of the entered light.

16 Claims, 8 Drawing Sheets

DIGITAL CAMERA HAVING A DISPLAY MENU USED TO SELECT EITHER COLOR PHOTOGRAPHING OPERATION OR A BLACK/WHITE PHOTOGRAPHING OPERATION

CROSS REFERENCE TO RELATED APPLICATIONS

This application is a continuation of U.S. application Ser. No. 11/076,026 filed Mar. 10, 2005, claiming priority from Japanese Application No. 2004-067916 filed Mar. 10, 2004. The entire disclosures of the afore-mentioned applications are hereby incorporated by reference in their entirety.

BACKGROUND OF THE INVENTION

The present invention is related to a digital camera.

Generally, in photographing operations by silver salt film cameras using monochromatic films, such color filters as a green filter, a yellow filter, an orange filter, and a red filter have been employed. When a color filter is employed, such a black/white image is photographed in which a correlation between a light amount of light having a wavelength which penetrates the color filter and a light amount of light entered to this color filter becomes stronger than a correlation between a light amount of light having a wavelength which is absorbed by the color filter and the light amount of the light entered to the color filter. For instance, when a green filter is used, such a light having a wavelength range of a substantially green color is strongly reflected to a contrast of a black/white image, whereas light having other wavelength ranges than the above-explained green-color wavelength range is absorbed by this green filter, and therefore, can be hardly and relatively reflected to the contrast of this black/white image. In photographing operations by silver salt film cameras using monochromatic films, color filters are selectively employed in accordance with sorts of photographing objects. Concretely speaking, for instance, a yellow filter is suitably used to photograph such scenes that a near sight to a middle sight constitute a photographic subject, and an orange filter is suitably used to photograph such a scene as to a far sight, while a telephoto lens is used. A red filter is suitably employed in order to further precisely photograph a far sight. Filters belonging to a green color series can own an effect capable of suppressing red colors, and at the same time, can obtain proper contrasts in a similar effect to that of a yellow filter. As a result, these green-color-series filters can control feelings as to skin and lips of persons to become mellow tones, and are especially suitable for photographing females. In virtue of filter works capable of selectively using these color filters, even when photographing operations are carried out by using monochromatic films in which colors are represented in dark/light monochrome, effects which are fitted to images owned by photographers may be represented.

In the case that black/white images are photographed by using digital cameras, gradation values of pixels every color, which constitute photographed color images, are weighted, and then, the weighted gradation values are added to each other, so that such black/white images can be obtained to which the same effects as those of color filters employed in silver salt film cameras have been given. In other words, the black/white images having strong correlations with a specific color can be acquired. As a consequence, since weighting process for specific color which is wanted to be strongly correlated is selected, filter works similar to those of silver salt film cameras may be realized.

In the case of a silver salt film camera, since a target color filter can be distinguished from other color filters by checking a color of this target color filter, a selection of a desirable color filter can be easily carried out. However, in the case of a digital camera, for example, when such a weighting process is selected by which an equivalent effect to a "yellow filter" of a silver salt film camera may be obtained, and such a weighting process is selected by which an equivalent effect to a "green filter" thereof may be obtained, since physically existing color filters are not selected, disable color filters are selected from a menu displayed on a LCD, or by operating an operation switch. However, in this case, if selection items are displayed by way of character strings such as "yellow filter" and "green filter", then a user can hardly and intuitively grasp colors. As a result, there is a deterioration problem as to operability of digital cameras.

Further, since a color filter is located in front of a lens in a silver salt film camera, a user can always become aware of presence of this color filter. Accordingly, such an erroneous event can hardly occur. That is, although the user does not want to perform a photographing operation using such a color filter, the user mistakenly performs this photographing operation using the color filter. However, since a color filter is not physically employed in a digital camera, in the case that a user forgets that the color filter has been selected, such an event that a photographed result differs from an expected result may occur.

SUMMARY OF THE INVENTION

The present invention has been made to solve the above-described problems, and therefore, has an object to provide a digital camera capable of easily performing a filter work required in a monochromatic photographing operation.

In order to solve the aforesaid object, the invention is characterized by having the following arrangement.

(1) A digital camera comprising:

an imaging unit that photoelectrically converts entered light to output a color image;

a selecting unit that selects any one identifier from one or more identifiers which are colored in different colors from each other; and a black/white image producing unit that produces a black/white image by weighting gradation values of respective colors for each of pixels of the output color image and adding the weighted gradation values of respective colors to each other, wherein when the light entered to the imaging unit is entered to a color filter having a color which is substantially equal to a color of the identifier selected by the selecting unit, a correlation between a light amount of light having a wavelength which penetrates the color filer and a light amount of the entered light becomes stronger than a correlation between a light amount of light having a wavelength which is absorbed by the color filter and the light amount of the entered light.

(2) The digital camera according to claim 1, wherein the selecting unit includes the identifier with respect to each of selectable colors, a pointing symbol for pointing any one of the identifiers, and an operation switch for moving one of the identifier and the pointing symbol; and the selecting unit accepts the identifier which is pointed by the pointing symbol as the identifier.

(3) The digital camera according to (2), wherein the identifier includes a circle which is painted over with the color.

(4) The digital camera according to (1), wherein the selecting means includes an operation switch for selecting the identifier, and a first display unit for displaying thereon only the identifier which is selected by the operation switch.

(5) The digital camera according to (4), wherein the identifier includes a circle which is painted over with the color.

(6) The digital camera according to (1) further comprising a second display unit capable of displaying arbitrary information, wherein the selecting unit displays a menu used to select the identifier on the second display unit, while the identifier is represented in the menu as a selection item.

(7) The digital camera according to (6), wherein the selecting unit displays as the identifier a circle which is painted over with the color.

(8) The digital camera according to (6), wherein the second display means includes an image display unit for displaying thereon the black/white image produced by the black/white image producing unit.

(9) The digital camera according to (8), wherein the image display unit displays both the black/white image and the identifier which is selected when the black/white image is produced on the second display unit.

(10) The digital camera according to (9), wherein the image display unit displays the identifier by a circle which is painted over with the color.

(11) The digital camera according to (6), further comprising through image display unit that displays a through image on the second display unit based upon the color image outputted from the imaging unit, and displays the identifier which is selected when the through image is displayed on the second display unit.

(12) The digital camera according to (11), wherein the through image display means displays the identifier by a circle which has been painted over with the color.

(13) A digital camera according to (11), wherein the through image display unit displays on the second display unit, a black/white through image which is produced by the black/white image producing unit based upon both the color image outputted from the imaging unit and the identifier which is selected when the color image is outputted.

In accordance with the digital camera, when a colored identifier is selected, such a black/white image can be obtained to which an equivalent effect has been applied, while this equivalent effect is obtained in such a case that a photographing operation of a black/white image is carried out by employing such a color filter having a color substantially equal to a color of this selected identifier in a silver salt film camera. In other words, a process operation that an effect equivalent to an effect achieved by which color of the color filter employed in the silver salt film camera is given to the black/white image can be selected based upon the color of the identifier. As a result, the user can intuitively grasp a desirable color as compare with such a case that such a desirable color is selected from selection items which are displayed by such character strings as "green filter", and thus, the user can readily perform the color filter selection. As a consequence, in accordance with the above-described digital camera, the filter work of the monochromatic photographing operation can be readily carried out.

In accordance with the digital camera, since the identifier under selection is continuously pointed by the pointing symbol, the user can readily confirm the color under selection without performing a specific operation.

In accordance with the above digital camera, since a color filter of a silver salt film camera is a circle, if a circle which has been painted over is displayed as an identifier, then, a user can suppose the color filter of the silver salt film camera, and further, the user can intuitively understand that a selection of this identifier is essentially equal to a selection of the color of this color filter of the silver salt film camera.

In accordance with this digital camera, since the identifier under selection is displayed on the first display means, the user can easily know that which color has been selected by viewing the first display means.

According to this digital camera, the user can intuitively understood a meaning of the identifier.

According to this digital camera, when the identifier is selected from the menu, this identifier can be selected based upon the color, so that the identifier can be easily selected. In other words, the filter work can be easily carried out.

According to this digital camera, the user can intuitively understand the meaning of the identifier. Further, in the digital camera according to the present invention, the second display means is further comprised of: image display means for displaying thereon the black/white image produced by the black/white image producing means.

In accordance with this digital camera, when the user displays the photographed black/white image, the user can know such an identifier which has been selected when this black/white image was photographed. As a consequence, the user can readily grasp as to whether or not this black/white image is such an image to which a filtering process operation equivalent to which color filter of the silver salt film camera has been given.

According to this digital camera, the user can intuitively understand the meaning of the identifier. As a result, the user can know that the black/white image under display has a correlation with respect to a specific color.

In accordance with this digital camera, the user can readily know that the identifier has been selected and which color of this identifier has been selected when the photographing operation is carried out.

According to this digital camera, the user can intuitively understand the meaning of the identifier.

In accordance with this digital camera, the user can confirm the effect achieved by the selected identifier before the photographing operation, and can perform the photographing operations in a higher efficiency without executing useless photographing operation.

It should also be understood that the respective functions owned by the plural means provided in the digital camera of the present invention can be realized by hardware resources whose functions are specified by structures themselves, hardware resources whose functions are specified by a program, or by combining these hardware resources with each other. The respective functions of these plural means are not limited only to such functions which are realized by hardware resources, while these hardware resources are physically independent from each other.

DETAILED DESCRIPTION OF PREFERRED EMBODIMENTS

Embodiments according to the present invention will now be explained based upon embodiment.

First Embodiment

Figure 2:
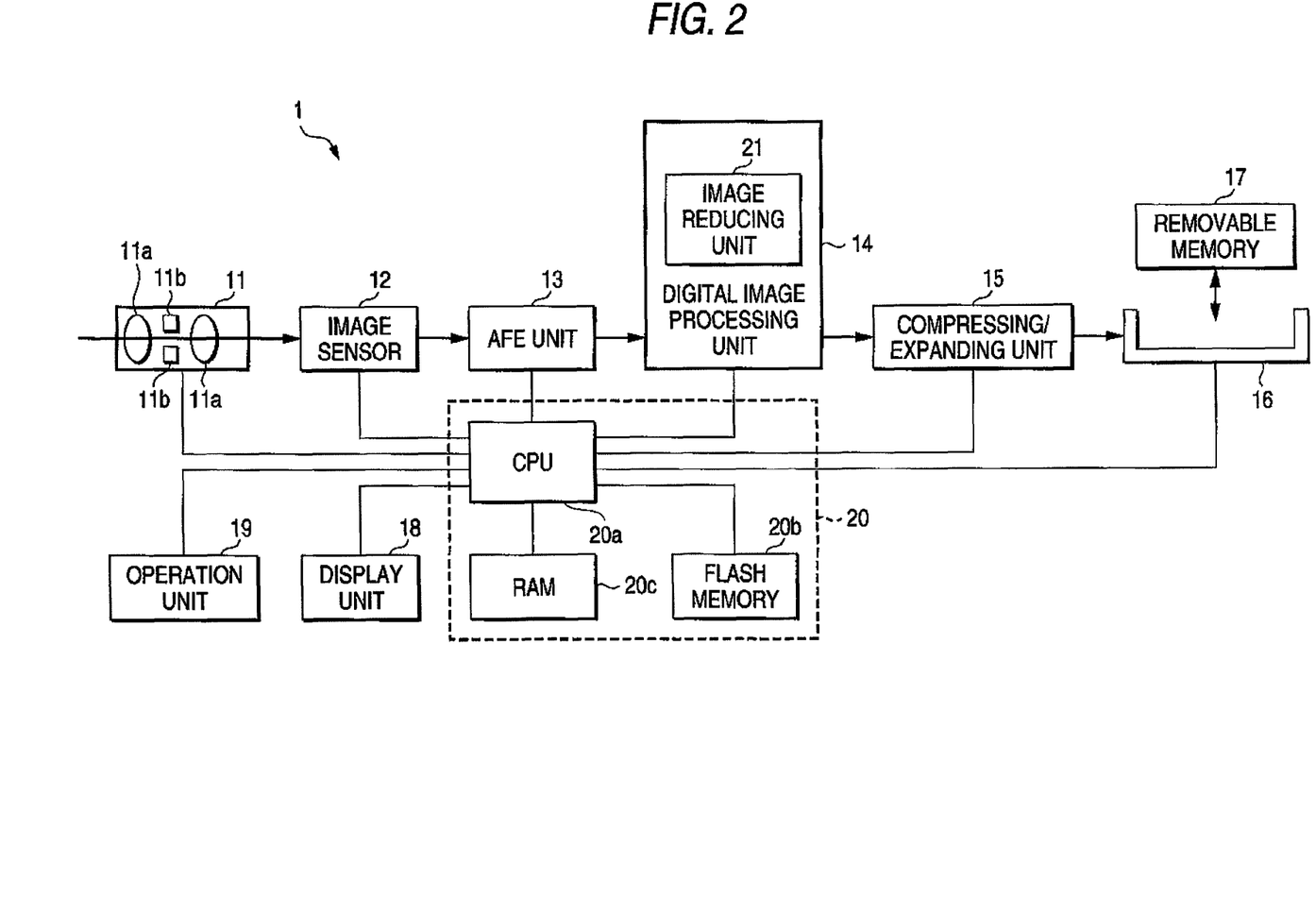
FIG. 2 is a block diagram for representing a digital camera according to the first embodiment of the present invention.

FIG. 2 is a block diagram for representing a hardware structure of a digital still camera (DSC) 1 functioning as a digital camera according to a first embodiment of the peasant invention.

An optical system 11 is arranged by a lens group 11*a*, a diaphragm 11*b*, and the like. The lens group 11*a* is constituted by one set, or more sets of lenses. The diaphragm 11*b* is mounted in the lens group 11*a*. The optical system 11 causes light to be entered to a light receiving plane of an image sensor 12.

The image sensor 12 corresponds to an imaging element, for instance, a so-called "CCD image sensor", a so-termed "CMOS image sensor." The image element is equipped with a photoelectric converting element which is positioned in a two-dimensional space in a discrete manner, and an electron transfer element known as a CCD (Charge-Coupled Device). The image sensor 12 is driven by a sensor controller (not shown). The image sensor 12 stores thereinto an electrical charge for a constant time period every photoelectric converting element, and then, outputs an electric signal in response to a light receiving amount every photoelectric converting element, while the electrical charge is obtained by photoelectrically converting light which is entered by the optical system 11. In the image sensor 12, since 4 color filters (namely, cyan color filter, magenta color filter, yellow color filter, and green color filter) are provided on the light receiving plane thereof, or 3 color filters (namely, red color filter, green color filter, and blue color filter) are mounted on the light receiving plane thereof, color image information can be acquired. In the first embodiment, an explanation is made of such an assumption that 3 color filters arranged by R(red), G(Green), and B(Blue) color filters have been provided. A storage amount (exposure amount) of electrical charges to the image sensor 12 is determined based upon both the diaphragm 11*b* and open time of a mechanical shutter (not shown) which is mounted between the optical system 11 and the image sensor 12. It should be noted that exposure time of the image sensor 12 may be alternatively adjusted by electrically controlling the charge storage time itself of the image sensor 12.

An analog front-end (AFE) unit 13 quantizes an electric signal outputted from the image sensor 13 into a digital signal by an A/D converter, and then, outputs the converted digital signal. Concretely speaking, for instance, the AFE unit 13 performs a CDS (Correlated Double Sampling) process operation, a level adjusting process operation of an electric signal, a quantizing process operation, and the like so as to output a digital signal to a digital image processing unit 14. The CDS process operation corresponds to such a process operation for reducing noise contained in the electric signal. In the level adjusting process operation, an optical black clamping control operation is performed so as to reproduce a black level of an image, and a gain of the electric signal is adjusted. The quantizing process operation quantizes the electric signal so as to produce a digital signal having a predetermined bit length. In the first embodiment, it is so assumed that the A/D converter quantizes the analog signal to produce a 12-bit digital signal. If a bit length of a digital signal is long, then an amount of information is increased, as compared with that of such a case that a bit length of a digital signal is short, and thus, various sorts of process operations can be carried out based upon a larger amount of information in a digital image processing unit 14 (will be explained later). As a result, an image quality can be improved. Since a maximum value of a bit length is determined in response to latitude (exposure allowable degree) of the image sensor 12, if the image sensor 12 owns wide latitude, then an electric signal may be quantized to obtain a digital signal having a longer bit length.

The digital image processing unit 14 performs a color image forming process operation, a white balance correction, a gamma correction, and a black/white image producing operation with respect to the digital signal outputted from the AFE unit 13, and executes a color space converting process operation for converting a color space of a formed color image, and performs such a process operation for converting a gradation value of either the formed color image or the formed black/white image into 8 bits, and then, outputs the image-processed image data to a control unit 20. In this case, a color image forming process operation corresponds to such a process operation capable of forming a color image, while R, G and B color information are given to all of pixels in such a manner that as to luminance information for 1 color which is outputted from respective pixels (color filters having one color have been formed on surface of image sensor 12) of the image sensor 12 in which the color filters are arranged in a pattern of, for example, checkers having a regulation, other two colors (any two colors of R, G, B colors) are interpolated based upon luminance information of the respective colors of vicinity pixels. The white balance correction corresponds to such a correction that a white color may be observed as a white color on a digital image even when light sources are different from each other. The DSC 1 performs the white balance correction based upon a sort of such a light source which is set by a user. A detailed content as to a process operation for producing a black/white image will be explained.

The digital image processing unit 14 is further equipped with an image reducing unit 21. The image reducing unit 21 reduces a digital image in response to an image reducing instruction of the control unit 20 so as to produce a reduced image (will be referred to as "reduced image" hereinafter). In this embodiment, a digital image implies both a color image and a black/white image. An image size of a reduced image is set by the control unit 20. In order to display a photographed digital image on a screen of an LCD 18*a* (see FIG. 3A), an image size of the photographed digital image is reduced up to the image size of the LCD 18*a* by the image reducing unit 21. Apparently, the size of the photographed digital image may be alternatively reduced to other image sizes than the above-explained image size by the image reducing unit 21. The reduced image which has been produced by the image reducing unit 21 is outputted to a removable memory 17 in relation to the original digital image (present image) by an external storage unit 16. Since this relative storage operation is carried out, digital images stored in the removable memory 17 can be quickly displayed on the screen of the LCD 18 in a simple manner. It should also be noted that the above-explained various sorts of process operations performed by the digital image processing unit 14 may be alternatively replaced by process operations by a computer program which are executed in the control unit 20.

A compressing/expanding unit 15 compresses a digital image outputted from the control unit 20, and expands a compressed digital image. Concretely speaking, the compressing/expanding unit 15 performs compression operations by employing, for example, the JPEG system corresponding to a non-reversible compression system, and a reversible compression system without discarding image data. The compressing/expanding unit 15 is arranged in such a manner that digital images outputted from the control unit 20 may be converted into TIFF type digital images without any image compression.

The external storage unit 16 is equipped with a card slot, a memory controller, and the like. The card slot is used so as to connect the removable memory 17 to this external storage unit 116. The removable memory 17 corresponds to a non-volatile and detachable storage medium. Under control by the control unit 20, the external storage unit 16 executes a process operation for writing a digital image compressed by the compressing/expanding unit 15 into the removable memory 17, and another process operation for reading out a digital image stored in the removable memory 17. In the first embodiment, such a case is exemplified in which a digital image is compressed by way of the JPEG system, and then, the compressed digital image is written as a file of the EXIF (Exchangeable Image File Format) system into the removable memory 17. It should also be noted that other file systems than the above-described EXIF system may be alternatively employed. Since an arbitrary tag may be set to an EXIF type file, it is so assumed that such an information for specifying an identifier which has been selected when a black/white image is photographed is written into a tag. Information for specifying an identifier corresponds to such an identifier number which is exclusively allocated to this identifier. If information for specifying an identifier is written into an EXIF type file, when a black/white image which has been stored in this EXIF type file is reproduced, then an identifier which has been selected during photographing operation can be displayed. As a result, a user can easily grasp that a black/white image which is being presently reproduced has been weighted in response to a specific color when this black/white image was produced, namely, an effect equivalent to that of a color filter of a silver salt film camera has been given to this black/white image. The user can readily grasp the color of this color filter. A detailed explanation as to this identifier will be made later.

A display unit 18 functioning as a second display unit is provided with an LCD (Liquid Crystal Display) 18a (refer to FIG. 3A), a display controller for controlling the LCD 18a, and the like. While the display unit 18 is controlled by the control unit 20, this display unit 18 displays various sorts of menus, through images, color images, black/white images, and the like on the LCD 18a. The display unit 18 may function as an electronic viewfinder in a photograph mode so as to display a through image on the LCD 18a. The display unit 18 displays either a reduced image which is produced by the image reducing unit 21 or the present image on the LCD 18a.

An operation unit 19 is equipped with a shutter button, a dial switch, a plurality of push button switches, a jog dial, and the like. The dial switch is used to set an exposure condition, and other sorts of photograph conditions. The plural push switches are employed so as to operate various sorts of menus. A detail content as to the operation unit 19 will be explained later.

The control unit 20 is equipped with a CPU 20a, a flash memory 20b, and a RAM 20c. The CPU 20a controls the entire system of the DSC 1 by executing a program stored in the flash memory 20b. The CPU 20a may function as an imaging unit, a selecting unit, a black/white image producing unit, an image displaying unit, and a through image displaying unit by executing a program stored in the flash memory 20b. The flash memory 20b corresponds to such a memory for storing thereinto various sorts of programs, data, and the like. The various sorts of programs and the data, which are stored in the flash memory 20b, may be alternatively downloaded from a predetermined server via a network so as to be stored in this flash memory 20b. Otherwise, the various sorts of programs and the data may be alternatively read out from a computer readable storage medium such as the removable memory 17 so as to be stored in this flash memory 20b. The RAM 20c corresponds to such a memory for temporarily storing thereinto various sorts of programs and data.

An "imaging unit" described in a scope of claim for a patent corresponds to the optical system 11, the image sensor 12, the AFE unit 13, the digital image processing unit 14, the operation unit 19, and the control unit 20.

A "selecting unit" described in the scope of claim for the patent corresponds to the display unit 18, the operation unit 19, and the control unit 20.

A "black/white image producing unit" described in the scope of claim for the patent corresponds to the digital image processing unit 14 and the control unit 20.

A "through image displaying unit" described in the scope of claim for the patent corresponds to the digital image processing unit 14 and the control unit 20.

Next, a description is made of an outer view of the DSC 1.

Figure 3:
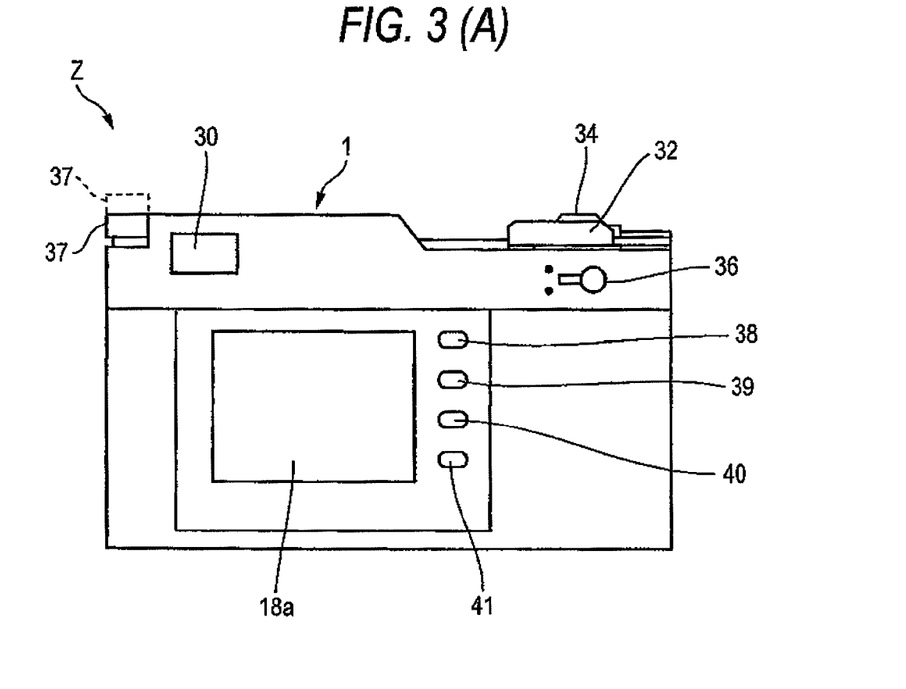
FIG. 3A is a rear view for indicating the digital camera according to the first embodiment of the present invention.
FIG. 3B is an upper view for indicating the digital camera thereof.

FIG. 3A is a rear view for showing the DSC 1, and FIG. 3B is an upper view for representing the DSC 1, as viewed from a Z direction shown in FIG. 3A.

An optical view-finder 30 is used in order that a user visually recognizes a photographing subject. As previously explained, it should be under stood that the user may alternatively perform a photographing operation, while the user observes the electronic view-finder 30.

A switch 31, a wind lever 32, a dial switch 33, a shutter button 34, a rotary type dial 35a, a lever switch 36, a jog dial 37, a display switch 38, a menu switch 39, an enter switch 40, and a cancel switch 41 constitute the operation unit 19.

The switch 31 is a power switch. The wind lever 32 is provided in order to perform a winding operation as follows. That is, a shutter screen under the condition that the shutter has been mechanically released is raised so to as to be mechanically fixed in such a manner that the shutter screen can again perform a subsequent shutter operation. The user winds the wind lever 32 before a photographing operation is performed so as to perform a shutter change, so that the mechanical shutter can be set to a photographing operation. The dial switch 33 corresponds to a rotary type switch used to select a shutter speed and a sort of a photograph condition. The shutter button 34 is installed at a center portion of the dial switch 33. Since the shutter button 34 is depressed, a photographing operation is commenced.

The rotary type dial 35a is mounted on an outer peripheral portion of a pointer type display apparatus 35 which is set adjacent to the dial switch 33. This rotary type dial 35a can adjust an exposure value from −2 EV to +2 EV in a step of ⅓ EV. A total number of remaining images which can be photographed is indicated on a fixing type ring 35b provided inside the rotary type dial 35a. A plurality of white balance corrections, a plurality of data formats, and a battery remaining power amount scale indicative of remaining battery power amount are indicated on a character board 35c which is provided inside the fixing type ring 35b. Concretely speaking, the plural data formats are represented as a character "R" indicative of the RAW format, a character "T" indicative of the TIFF format, a character "H" indicative of the JPEG format having a high compression ratio, and a character "N" representative of the JPEG format having a low compression ratio. The remaining image number, the presently selected item, and the remaining battery power amount are indicated by pointers 35g, 35d, 35e, and 35f, respectively. Since the user turns the jog. dial 37 so as to move a pointer while the user manipulates the lever switch 36, the item which is presently selected can be changed.

The jog dial 37 is provided in such a manner that this jog dial 37 can be rotated along an XY direction, and can be moved along a shaft direction of a rotary shaft. The jog dial 37 is provided in such a way that this jog dial 37 can be rotated at two positions along the shaft direction. It is so assumed in the below-mentioned descriptions that the side of this jog dial 37 which is located close to the housing 10 of the DSC 1 is referred to as a "lower position", whereas such a position where the jog dial 37 has been picked up from the low position to the upper side thereof is referred to as an "upper position". In FIG. 3A, the jog dial 37 which is located at the lower position is indicated by a solid line, and the jog dial 37 which is located at the upper position is indicated by a broken line. The user may set various sorts of operations and may select various sorts of functions by combining the respective switches with the jog dial 37.

A display switch 38, a menu switch 39, an enter switch 40, and a cancel switch 41 are set on the right side of the LCD 18a. The display switch 38 corresponds to a switch which is used to enter an instruction for instructing the LCD 18a to display thereon a reduced image. The menu switch 39 corresponds to a switch which is used to enter an instruction for indicating a menu used to select either a color photographing operation or a black/white photographing operation, and another menu used to select an identifier. Both the enter switch 40 and the cancel switch 41 correspond to switches which are used in menu operations.

Next, a description is made of a black/white image processing operation executed in the digital image processing unit 14. As previously explained, either a part or all of process operations as to the digital image processing unit 14 may be carried out by the control unit 20. As a consequence, a production of a black/white image may be carried out by the control unit 20. A production of a black/white image is carried out based upon a 12-bit color image formed by a color image forming process operation. The digital image processing unit 14 produces a black/white image in such a manner that as to each of pixels which constitute a formed color image, the digital image processing unit 14 adds gradation values to each other by weighting these gradation values which are owned by this relevant pixel every color. In this case, in the case that an image to be produced corresponds to a color image represented in RGB color spaces, a gradation value owned by a pixel every color implies such a gradation value every R color, G color, and B color. Concretely speaking, the process operation for adding the gradation values to each other by weighting these gradation values is carried out in accordance with the below-mentioned equations:

$$\text{standard } Y = 0.30R + 0.59G + 0.11B \quad \text{equation 1,}$$

$$\text{green filter } Y = -0.10R + 1.20G - 0.10B \quad \text{equation 2,}$$

$$\text{yellow filter } Y = 0.52R + 0.92G - 0.44B \quad \text{equation 3,}$$

$$\text{orange filter } Y = 0.60R + 0.50G - 0.10B \quad \text{equation 4,}$$

$$\text{red filter } Y = 0.70R + 0.50G - 0.20B \quad \text{equation 5.}$$

In a case that a black/white image is represented by YCbCr color spaces, a value obtained by an adding operation is stored in a Y (luminance) value of a pixel, and 0 is stored in Cb and Cr so as to produce the black/white image. In this case, a gradation range of "Y" is "0" to "255", whereas a gradation range of "Cb" and "Cr" is −128 to 127, respectively. A gradation range for each of RGB colors is "0" to "255." It should also be understood that such a black/white image expressed by RGB color spaces may be alternatively produced. In this alternative case, it is so assumed that the luminance value "Y" calculated by the above-explained equation 1 is stored to the RGB values of the pixel. Coefficients which are multiplied with respect to the respective RGB values of the above-described equations imply weighting. If the gradation values owned by the pixels every color are weighted to be added to each other in accordance with each of the above-described equations except for the equation 1, then such a black/white image can be obtained to which an equivalent effect has been given when a photographing operation using a monochromatic film is carried out by mounting a specific color filter on a silver salt film camera. The equation 1 corresponds to the weighting process which is defined by International Telecommunication Union Telecommunication (ITU-T) recommendation 601. Since the above-described equation 1 becomes a similar effect achieved when a photographing operation is carried out while a color filter is not mounted on a silver salt film camera, it is so assumed that the equation 1 is not involved in such a case that a color filter is employed in the first embodiment. In such a case that a color filter is employed, the user selects any one of the equations 2 to 5, whereas in the case that a color filter is not used, the equation 1 is applied. In the first embodiment, the equation 1 is assumed as the standard. For instance, when a green filter is mounted on a silver salt film camera, light having a wavelength approximated to the wavelength of the green color penetrates the green filter, and light having wavelengths other than the wavelength of the green color is absorbed by this green filter. As a result, a black/white image is produced in which a correlation between the light amount of the light having the wavelength of the green color and the light amount of the monochromatic light becomes stronger than a correlation between the light amounts of the light having the wavelengths other than the wavelength of the green light and the light amount of the monochromatic light. For instance, in the case of the equation 2, as apparent from a difference between the coefficients of this equation 2 and the coefficients of the standard, the value of G (green) is strongly reflected to the black/white image, as compared with that of the standard. The value of R (red) and the value of B (blue) can be hardly reflected to the black/white image, as compared with those of the standard. As a consequence, if the equation 2 is employed, then the green color may be more strongly reflected, and such a black/white image may be obtained to which a substantially equivalent effect has been applied, while this substantially equivalent effect is achieved by that a photographing operation is carried out by employing the green filter in the silver salt film camera. As a consequence, the black/white image produced by employing the equation 2 may become such a black/white image as follows: That is, in the case that light which has been entered when this black/white image is photographed is entered into the green filter of the silver salt film camera, a correlation between a light amount of light having a wavelength, which penetrates this green filter, and the light amount of the entered light becomes stronger than a correlation between a light amount of light having a wavelength, which is absorbed by this green filter, and the light amount of the entered light. A similar correlation effect may be achieved to other equations. In the first embodiment, the user selects a desirable equation by selecting a relevant identifier, and gradation values of a color image are added to each other by giving weights which are specified by this selected equation. By calculating the equation 2 through the equation 5, the similar effects to those obtained by utilizing the color filters in the silver salt film camera can be electronically obtained. Accordingly, in the first embodiment, it is so assumed that the equation 2 to the equation 5 will be referred to as the "color filters." Concretely speaking, the equation 2 will be referred to as the "green filter"; and the equation 3 will be referred to as the "yellow filter." A similar idea may be applied to an orange filter and a red filter.

Next, a GUI (Graphic User Interface) of the DSC 1 will now be explained.

Figure 4:
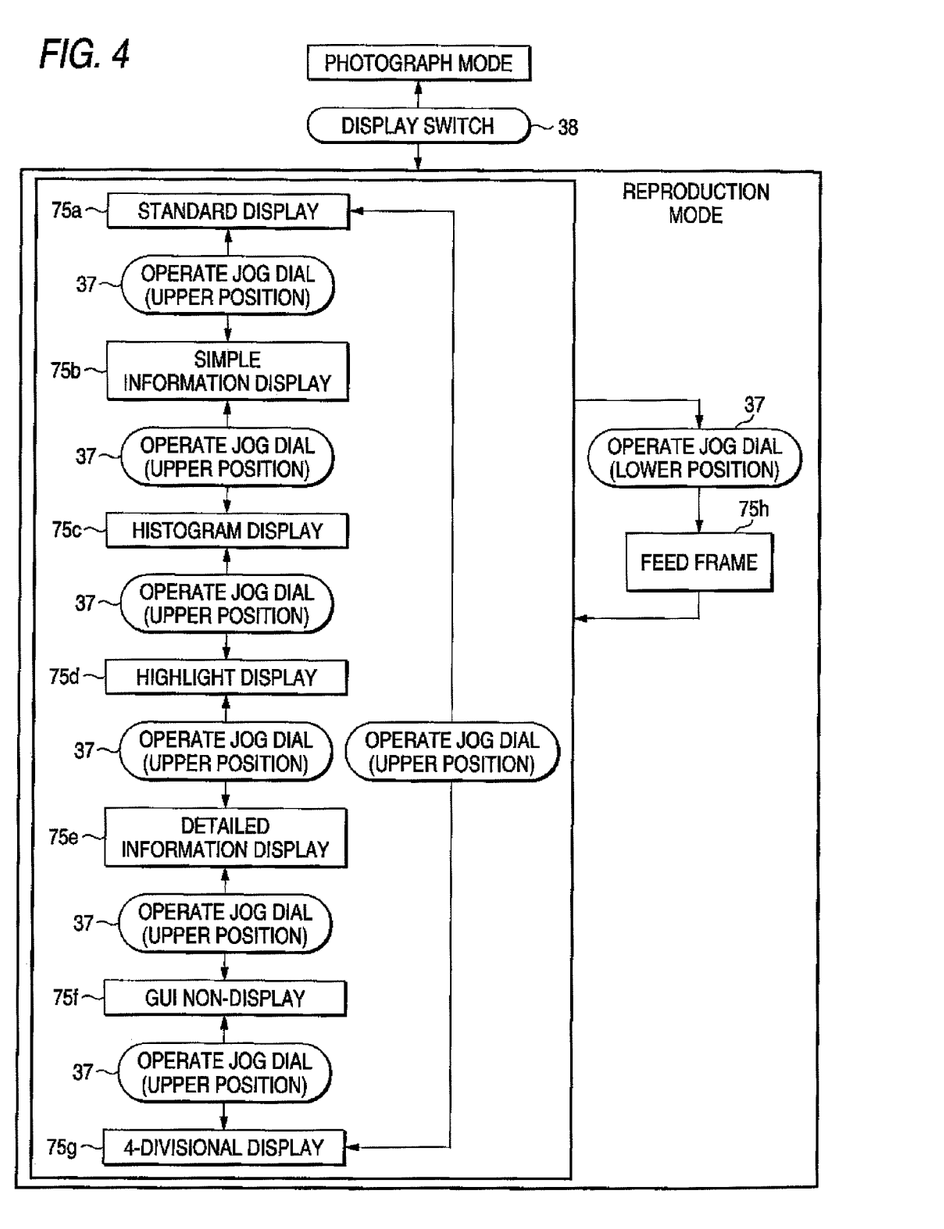
FIG. 4 is a schematic diagram for explaining a GUI related to the first embodiment of the present invention.

FIG. 4 is a schematic diagram for explaining the GUI of the DSC 1. When the power supply is turned ON, the DSC 1 is initiated, and the operation mode of this DSC 1 is transferred to the photograph mode. In the photograph mode, the image sensor 12 outputs an electric signal to the AFE unit 13 in a predetermined interval. The digital image processing unit 14 produces a color image based upon a digital signal which is outputted from the AFE unit 13 in the predetermined interval, and then, outputs the produced color images to the display unit 18 in this predetermined interval. As a result, a moving picture of a photographic object is displayed as a through image on the LCD 18a. In such a case that the monochromatic photographic operation has been selected, the control unit 20 controls the digital image processing unit 14 so as to produce a black/white image based upon either the equation 1 or the color filters (equation 2 to equation 5), which is specified by such an identifier, while this identifier has been selected at this time. The identifier will be explained later. As a result, a black/white through image is displayed. In the photograph mode, an upper grade menu used to execute various sorts of setting operations by performing a predetermined operation can be displayed. In the case that the monochromatic photographing operation is carried out, the user selects a menu for selecting a monochromatic photographing operation from the upper grade menu, and then, selects the monochromatic photographing operation from the displayed menu. In the case that such a black/white image is wanted to be photographed to which an effect equivalent to an effect achieved by a color filter used in the silver salt film camera has been given, the user selects such an identifier of a color which is substantially equal to this color filter. Subsequently, a description is firstly made of a menu used to select an identifier. Next, a display of a through image when both a monochromatic photographing operation and an identifier have been selected will be explained.

Figure 1:
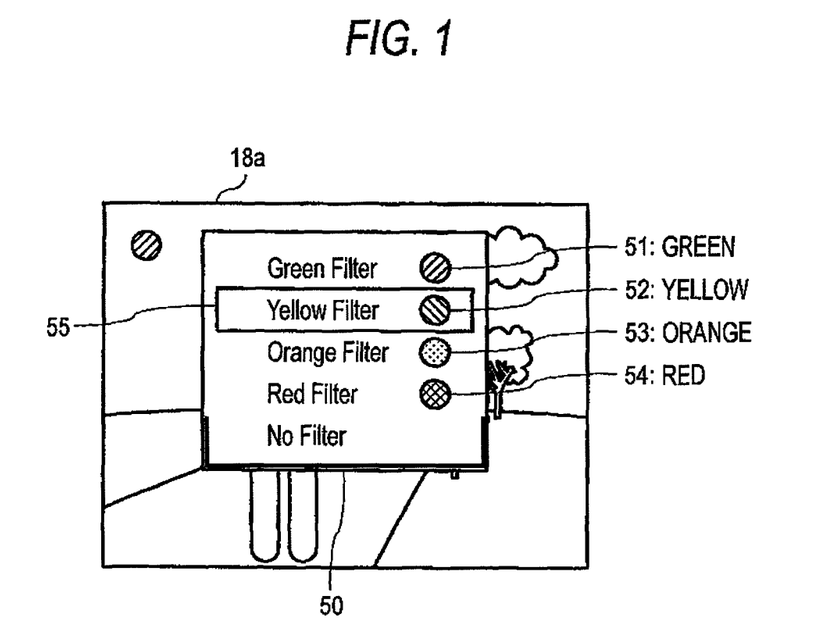
FIG. 1 is a schematic diagram for showing an example as to a menu related to a first embodiment of the present invention.

FIG. 1 is a schematic diagram for representing an example of a menu 50 used to select identifiers. On this menu 50, identifiers 51 to 54 which have been colored in different colors from each other are indicated, and "no filter" is indicated as selection items. The selection item "no filter" corresponds to the standard. Each of these identifiers 51 to 54 is employed so as to select any one of the selectable color filters (equation 2 to equation 5), and these identifiers 51 to 54 are displayed in the same colors as those of the corresponding color filters, or in substantially same colors as those of the corresponding color filters. A same color as that of a corresponding color filter implies that, for instance, if the green filter (equation 2) is selected, the green color is the color of the corresponding color filter. A substantially same color implies that, for example, when the green filter is selected, if the color of the identifier 51 is indicated within a color range defined from a light green to a dark green, then the user may suppose the green filter. As a result, if colors of identifiers 51 are displayed in the color range defined from the light green to the dark green, then these colors are assumed as the substantially same colors. The identifier 51 is displayed by a circle which has been painted over with a green color. The identifier 52 is displayed by a circle which has been painted over with a yellow color. The identifier 53 is displayed by a circle which has been painted over with an orange color. The identifier 54 is displayed by a circle which has been painted over with a red color. Since a color filter of a silver salt film camera is a circle, if a circle which has been painted over is displayed as an identifier, then, a user can suppose the color filter of the silver salt film camera, and further, the user can intuitively understand that a selection of this identifier is essentially equal to a selection of the color of this color filter of the silver salt film camera. As a consequence, operability of the DSC 1 may be improved. It should also be noted that instead of such a circle which has been painted over with color, a more real image as to a color filter of a silver salt film camera may be alternatively displayed.

In the first embodiment, such character strings as "green filter", "yellow filter", "orange filter", and "red filter" are displayed in combination with the circles which have been painted over with the relevant colors. If these character strings are not required, then these character strings need not be displayed. Alternatively, these character strings may be displayed by way of characters of the corresponding colors. In such a case that character strings which have been colored are displayed, since these colored character strings play a role of identifiers, there is no need that the circles which have been painted over with the colors are always displayed. However, it is desirable to display the circles which have been painted over with the colors in view of operability of the DSC 1. The user operates the operation unit 19 so as to move a cursor 55 to a target identifier, and then, depresses a preselected button in order to select a target color.

Figure 5:
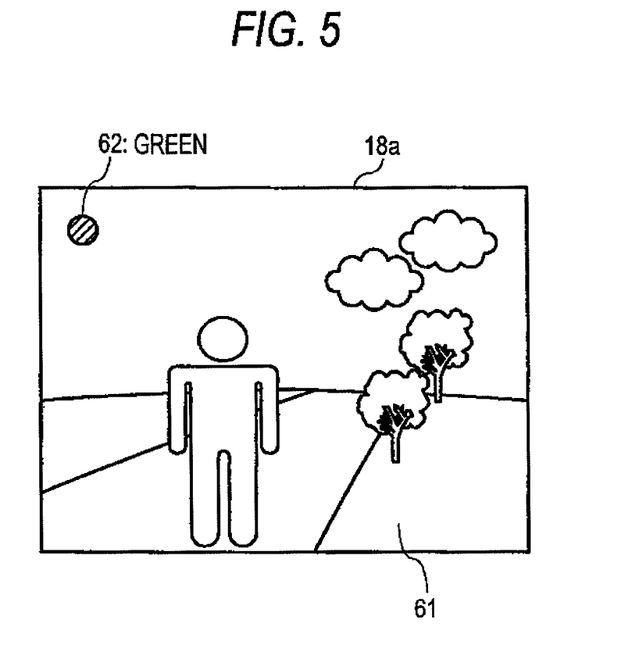
FIG. 5 is a schematic diagram for showing a through image related to the first embodiment of the present invention.

FIG. 5 is a schematic diagram for indicating an example of the LCD 18a under such a condition that a black/white image 61 is displayed thereon as a through image. The control unit 20 controls the display unit 18 in such a manner that an identifier under selection is displayed, and the display unit 18 displays an identifier 62 which is presently selected on the LCD 18a in such a manner that this identifier 62 is superimposed on a black/white through image with color, as indicated in this drawing. The identifier 62 is indicated by a circle which has been painted over with this color in a similar manner to that of the case of the menu 50. When the black/white through image is displayed, the user can readily grasp that if the user now performs a photographing operation, then a monochromatic photographing operation is carried out, and furthermore, the user can confirm the effect achieved by the selected identifier 62 before the photographing operation is carried out, so that the user can effectively perform the black/white photographing operation without any useless photographing operation. When such an identifier under selection is displayed on the LCD 18a, the user can easily grasp that the identifier as to the specific color has been selected, and can readily know that which color of the identifier has been selected during photographing operation. As a result, such an event that the photographed result becomes different from the predicted photographed result can hardly occur.

When the shutter button 34 is depressed in the photograph mode, the digital image processing unit 14 outputs either a color image or a black/white image, which have been produced, to the compressing/expanding unit 15. Concretely speaking, if both a black/white photographing operation and an identifier are selected, the digital image processing unit 14 produces a black/white image based upon such a color filter which is specified by the selected identifier, and then, outputs the produced black/white image. If the identifier is not selected while the black/white photographing operation has been selected, the digital image processing unit 14 produces a black/white image based upon the standard, and then, outputs the produced black/white image. If a color photographing operation has been selected, then the digital image processing unit 14 outputs a color image. The compressing/expanding unit 15 compresses the outputted digital image based upon the setting condition, and then, stores the compressed digital image in the removable memory 17. At this time, as previously explained, if a black/white image is stored in the removable memory 17, then the information for specifying the identifier which has been selected at this time is written into a tag of an EXIF file.

When the display mode 38 is depressed in the photograph mode, the present operation mode of the DSC 1 is transferred to the reproduction mode. The reproduction mode corresponds to such a mode that an image which has been stored in the removable memory 17 is displayed on the LCD 18a. When the jog dial 37 is located at the lower position in the reproduction mode, the user rotates the jog dial 37, so that image files (EXIF files) which have been stored in the removable memory 17 are selected in a predetermined sequence, and then, the selected image files are displayed on the screen of the LCD 18a. The selection sequence of the image files corresponds to either an ascent sequence or a descent sequence of file names which contain a serial number. This serial number is applied to these image files when photographing operations are carried out. In other words, a selection sequence of images becomes a photographing sequence of the images when the jog dial 37 is rotated along a right direction, whereas a selection sequence of images becomes the opposite sequence with respect to the photographing sequence when the jog dial 37 is rotated along a left direction. It should be noted that the selection sequence of the images need not be equal to the sequence of the image files, but may be alternatively set based upon a sequence as to photographed day/time of the images.

In the reproduction mode, a reduced image of a file which is being selected at this time, a present image, or various sorts of attached information as to the present image is displayed. Concretely speaking, the DSC 1 of the first embodiment owns a plurality of reproduction modes, namely, a standard display 75a; a simple information display 75b; a histogram display 75c, a highlight display 75d, a detailed information display 75e, a GUI non-display 75f, and a 4-divisional display 75g. When the user rotates the jog dial 37 at the upper position, the control unit 20 displays the reduced image, the present image, or the attached information in the reproduction mode in response to this rotation of the jog dial 37.

When the jog dial 37 is rotated at the lower position in a specific reproduction mode during which a specific image file has been selected, image files of preceding/succeeding sequences are newly selected (75h), and reduced images, present images, or attached information as to the newly selected image files are directly displayed in the reproduction mode. At this time, if the present image corresponds to a black/white image, then a monochromatic image is displayed. If the present image corresponds to a color image, then a color image is displayed.

In the standard display 75a, either a reduced image or a present image is synthesized with "image number/total number of images", and then, this synthesized image/number is displayed. When a specific image file is selected, the control unit 20 firstly displays a reduced image of this specific image file, and thereafter, may alternatively display a present image of this specific image file. Similarly, even in other reproduction modes for displaying images, when a specific image file is selected, the control unit 20 firstly displays a reduced image of this specific image file, and thereafter, may alternatively display a present image of this specific image file.

In the simple information display 75b, either a reduced image or a present image is synthesized with a present "image number/total number of images", a file number, a photograph quality, a file protection, and a photograph day/time, and then, the synthesized image/items is displayed.

In the histogram display 75c, either a reduced image or a present image is synthesized with a present "image number/ total number of images", and a histogram of a luminance value, and then, the synthesized image/items is displayed. It should also be noted that only the histogram may be alternatively displayed without displaying the image in the histogram display 75c.

In the highlight display 75e, a reduced image is displayed, or white skipping portions of a present image are displayed on the reduced image.

In the detailed information display 75e, either a reduced image or a present image is synthesized with a present "image number/total number of images", a file number, a photograph quality, a file protection, a photograph day/time, a shutter speed, an identifier, a white balance (WB), resolution, an ISO sensitivity, and a film setting condition, and then, the synthesized image/items is displayed. A detailed content of this detailed information display 75e will be explained later.

In the GUI non-display 75f, only either a reduced image or a present image is displayed.

In the 4-divisional display 75g, respective reduced images of 4 image files whose file names are continued are displayed in respective regions which are produced by dividing one screen by 4.

Next, the detailed content as to the detailed information display 75e will now be explained.

Figure 6:
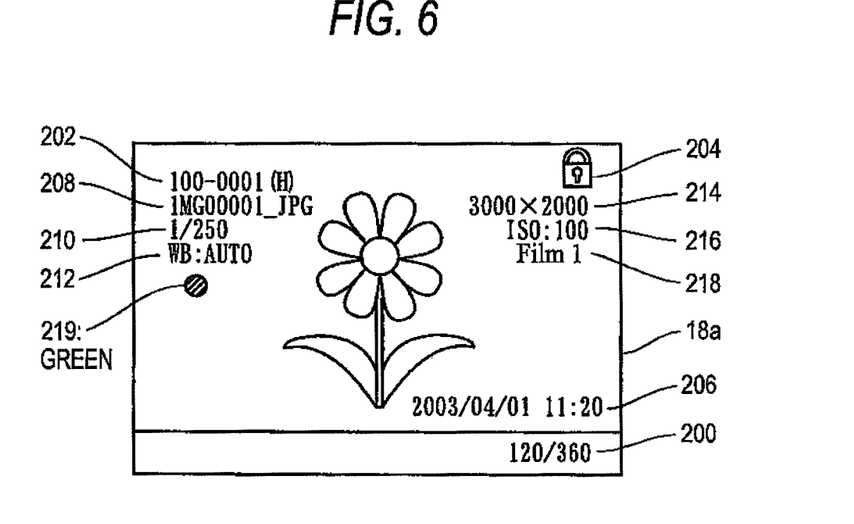
FIG. 6 is a schematic diagram for indicating one example as to a display of identifiers related to the first embodiment of the present invention.

FIG. 6 is a schematic diagram for indicating an example of displays when the detailed information display 75e is selected. In addition to an image, a present image number/ total number of images 200; a file number+photograph quality 202; a file protection 204; a photograph day/time 206; a file name 208; a shutter speed 210; an identifier 219; a white balance (WB) 212; resolution 214; an ISO sensitivity 216; and a film setting condition 218 are displayed in the detailed information display 75e. The identifier 219 is read out from a tag to be displayed only when an image is a black/white image. The identifier 219 is displayed as a circle which has been painted over with color in a similar manner to the above-described menu 50, and the like. If the identifier 219 is displayed, when a photographed black/white image is displayed, the user can grasp such an identifier which has been selected when this black/white image is photographed. As a result, the user can easily grasp that this black/white image corresponds to such an image to which a process operation equivalent to that of a color filter of a silver salt film camera has been applied. It should also be noted that an identifier may be alternatively displayed in another reproduction mode.

In accordance with the above-described DSC 1 related to the first embodiment of the present invention, since such an identifier used for selecting any one of the equation 2 to the equation 5 has been colored in the color corresponding to this selected equation, when an effect equivalent to that of a color filter having a specific color used in a silver salt film camera is wanted to be given to a black/white image, such an equation capable of achieving the effect equivalent to that of the relevant color filter can be selected by selecting such an identifier which has been colored in the substantially same color as the color of this color filter. As a consequence, since the user can intuitively grasp the color, the selection of the relevant equation can be easily carried out, as compared with such a case that the user selects the relevant equation from the selection items indicated by the character strings such as "green filter." As a result, in accordance with this digital camera 1, the filter work for the monochromatic photographing operation can be readily carried out.

In the first embodiment, the black/white image has been produced during the photographing operation. Alternatively, the black/white image may be produced from a color image which has been stored in the removable memory 17.

Although the digital still camera has been exemplified in the first embodiment, the present invention may be applied to a digital video camera.

Second Embodiment

A second embodiment of the present invention is such an example that an identifier is mechanically selected by an operation switch. In this second embodiment, three switches are exemplified as the operation switch, namely, a slide type switch for moving a pointing symbol, a dial type switch for moving a pointing symbol, and another dial type switch for moving an identifier.

Figure 7:
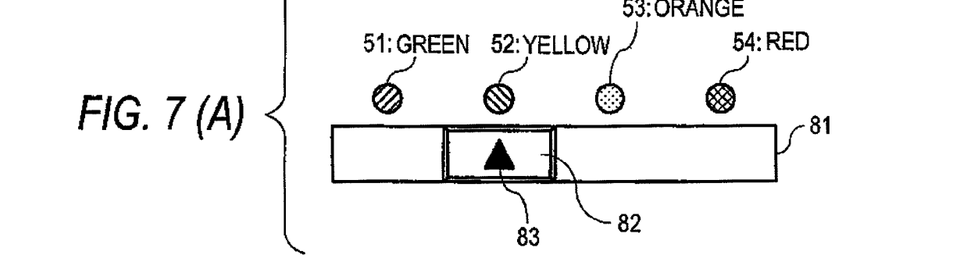
FIG. 7A, FIG. 7B, and FIG. 7C are schematic diagrams for showing operation switches of a digital camera according to a second embodiment of the present invention.

FIG. 7A is a schematic diagram for representing an example of a slide type switch 81 for moving a pointing symbol. Concretely speaking, the slide type switch 81 is provided on either an upper plane or a rear plane of a DSC according to the second embodiment. In the slide type switch 81 shown in the example, a slide button 82 is provided in a slidable manner along a horizontal direction, and switches are provided at 4 portions along the slide direction. Each of these 4 switches is turned ON by contacting the slide button 82, and thus, a control signal responding to this turned-ON switch is outputted to the control unit 20. The control unit 20 judges that which switch is turned ON based upon an outputted signal. An identifier 51 to an identifier 54 are indicated at the positions where the respective 4 switches are turned ON in such a manner that, for instance, these identifiers 51 to 54 are adhered as seals, or are colored by paint. Similar to the first embodiment, the identifier 51 to the identifier 54 are indicated as circles which have been painted over with a green color, a yellow color, an orange color, and a red color. For example, when the slide button 82 is slid so as to make the pointing symbol 83 coincident with the green-colored identifier 51, the control unit 20 selects a green filter based upon a control signal outputted from the switch corresponding to the green colored identifier 51.

FIG. 7B is a schematic diagram for indicating an example as to a dial type switch 84 for moving a pointing symbol 85. This dial type switch 84 corresponds to a switch for outputting a control signal in response to a rotation angle. The identifier 51 to the identifier 54 are represented at positions responding to angles where control signals are outputted. For example, the identifier 51 for the green color is expressed at such a position pointed by the pointing symbol 85 at an angle when a control signal for selecting a green filter is outputted.

FIG. 7C is a schematic diagram for showing an example as to a dial type switch 86 for moving identifiers 51 to 54. The structure of this dial type switch 86 is essentially identical to that of the dial type switch 84 shown in FIG. 7B, and merely owns such a different point that the arrangements as to the identifier 51 to the identifier 54 and the pointer symbol 85 shown in FIG. 7B are replaced by each other.

In accordance with the above-explained DSC related to the second embodiment of the present invention, since the selected identifier is continuously pointed out by the pointing symbol, the user can easily confirm the color which is being selected at this time without executing the specific operation. Since the structure of the DSC is simple, this simple structure can be readily designed.

Third Embodiment

A third embodiment of the present invention corresponds to such an example that only an identifier under selection is displayed on a first display unit. In the third embodiment, two examples as to a compact color displayable LCD and LEDs are exemplified.

Figure 8:
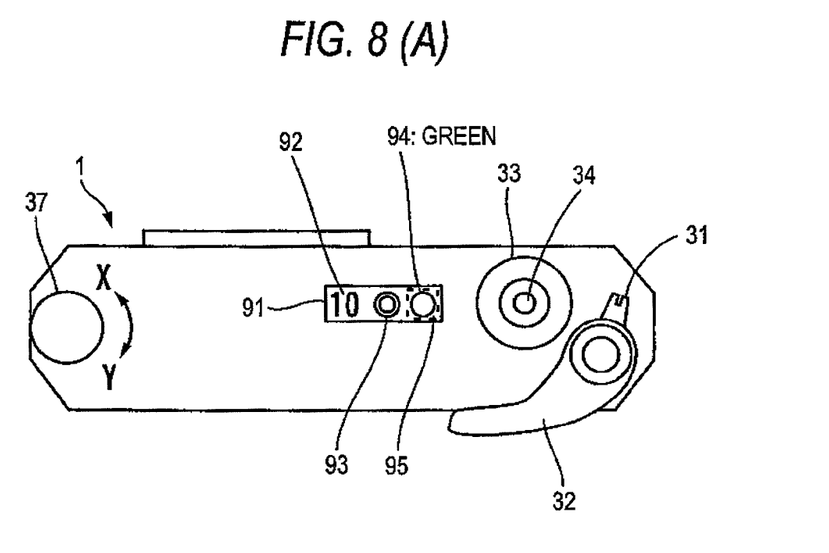
FIG. 8A and FIG. 8B are schematic diagrams for representing one example of a first display menus employed in a digital camera according to a third embodiment of the present invention.

FIG. 8A is a schematic diagram for showing an example of a compact LCD 91, and is an upper view for representing a DSC 90 according to the third embodiment. The DSC 90 is equipped with the compact LCD 91. The compact LCD 91 is employed so as to display thereon a remaining photograph number 92, a setting condition 93 under selection, and an identifier 94 under selection. The identifier 94 is displayed in such a region 95 on the display region of the compact LCD 91, which is surrounded by a dot line in FIG. 8A. This region 95 corresponds to a dedicated display region where information other than the identifiers is not displayed. The first display unit for displaying only the identifier under selection corresponds to a function capable of displaying an identifier on the region 95 among the display functions of the compact LCD 91. Similar to the first embodiment, the identifier 94 is displayed as a circle which has been painted over with color. Concretely speaking, the setting condition under selection implies a white balance correction, a compression ratio, and the like. The information other than the identifiers may be properly selected.

FIG. 8B is a schematic diagram for indicating an example of LEDs, and is an upper view for showing a DSC 96 which is different from the DSC 90 of FIG. 8A. The DSC 96 is equipped with 4 sets of an LCD 97 through an LCD 100. The LCD 97 through the LCD 100 are provided in correspondence with selectable identifiers in an one-to-one relationship. The respective LEDs 97 to 100 emit green light, yellow light, orange light, and red light, respectively. While these colors correspond to color filters, only such an LED is turned ON which corresponds to any one of these identifiers which is being selected. In the DSC 96, the LED 97 to the LED 100 correspond to a first display unit.

In the third embodiment, the user selects an identifier by way of the menu 50 as explained in the first embodiment, or the operation switch as explained in the second embodiment. For instance, in the case that the user selects an identifier by using the menu 50, the identifier selected in the menu 50 is displayed on the compact LCD 91, or by the LED 97 to the LED 100. As a result, the user can confirm the selected identifier at any time without performing a specific operation while the power supply is turned ON. For instance, in the case that the user selects the identifier by manipulating the operation switch as described in the second embodiment, even when the identifier is not represented at the position where the switch is turned ON, since the user views the compact LCD 91, the user can confirm that which identifier is being now selected. For example, in such a case that a single operation switch is commonly used in a plurality of operations, if there is a representation corresponding only to a specific operation, then this specific operation is hardly distinguishable from other operations. If these operations are displayed on either the compact LCD 91 or the LED 97 through the LED 100, the user can recognize the identifier under selection even when these operations are not represented on the operation switch. As a consequence, even when a single operation switch is utilized for various sorts of operations, the user can recognize the identifier under selection without any confusion, resulting in superior operability with respect to the user.

What is claimed is:

1. An imaging apparatus comprising:
    an imaging unit that photoelectrically converts input light to output a first color image and a second color image;
    a selecting unit that selects one of identifiers in response to an instruction from a user, each of the identifiers identifying a corresponding color;
    a first image producing unit that produces a first monotone image based on the first color image and a selected identifier;
    a second image producing unit that produces a second monotone image;
    an image displaying unit that displays, on a display, a through image of the first monotone image together with the selected identifier; and
    an image controlling unit that receives a shutter operation while the through image of the first monotone image and the selected identifier are displayed on the display, the image controlling unit that, in response to the shutter operation, causes the imaging unit to output the second color image and causes the second image producing unit to produce the second monotone image based on the second color image and the selected identifier, wherein
    the selected identifier is displayed with the through image of the first monotone image in which effect achieved by the selected identifier is reflected, on the display,
    a selector used to select the one of identifiers is displayed on the display in such a manner that the user can select the one of identifiers, and
    the one of identifiers in the selector is selected when a button is depressed.

2. The imaging apparatus according to claim 1, wherein
    the instruction from the user is instructed by using a switch that indicates one of the identifiers, and
    the image displaying unit displays the selected identifier which is selected by the selecting unit with the switch.

3. The imaging apparatus according to claim 1, wherein
    the selecting unit selects one of an item and the identifiers, and
    the item does not correspond to a color.

4. The imaging apparatus according to claim 1, wherein
    the image displaying unit displays the selected identifier using a circle filled with a color identified by the selected identifier which is selected.

5. The imaging apparatus according to claim 1, wherein
    the second image producing unit produces the second monotone image by weighting gradation values of respective colors for each of pixels of the second color image and adding the weighted gradation values of respective colors to each other, in accordance with the selected identifier.

6. The imaging apparatus according to claim 1, further comprising:
    a recording unit that stores the second monotone image and information for specifying the selected identifier in a recording medium in response to the shutter operation.

7. The imaging apparatus according to claim 6, wherein
    the image displaying unit reads out the second monotone image from recording medium to display the second monotone image on the display.

8. The imaging apparatus according to claim 1, wherein
    the second monotone image does not include an image of the selected identifier.

9. An imaging method comprising:
    photoelectrically converting input light to output a first color image and a second color image;
    selecting one of identifiers in response to an instruction from a user, each of the identifiers identifying a corresponding color;
    producing a first monotone image based on the first color image and the selected identifier;
    displaying, on a display, a through image of the first monotone image together with a selected identifier;
    receiving a shutter operation while the through image of the first monotone image and the selected identifier are displayed on the display; and
    in response to the shutter operation, outputting the second color image and producing a second monotone image based on the second color image and the selected identifier, wherein
    the selected identifier is displayed with the through image of the first monotone image in which effect achieved by the selected identifier is reflected, on the display,
    a selector used to select the one of identifiers is displayed on the display in such a manner that the user can select the one of identifiers, and
    the one of identifiers in the selector is selected when a button is depressed.

10. The imaging method according to claim 9, wherein
    the instruction from the user is instructed by using a switch that indicates one of the identifiers, and
    the selected identifier, which is selected by the selecting unit with the switch, is displayed.

11. The imaging method according to claim 9, wherein
    one of an item and the identifiers is selected in response to the instruction from the user, and
    the item does not correspond to a color.

12. The imaging method according to claim 9, wherein
    the selected identifier is displayed using a circle filled with a color identified by the selected identifier.

13. The imaging method according to claim 9, wherein
    the second monotone image is produced by weighting gradation values of respective colors for each of pixels of the second color image and adding the weighted gradation values of respective colors to each other, in accordance with the selected identifier.

14. The imaging method according to claim 9, further comprising:
    storing the second monotone image and information for specifying the selected identifier in a recording medium in response to the shutter operation.

15. The imaging method according to claim 14, wherein
    the second monotone image is read out from recording medium to display the second monotone image on the display.

16. The imaging method according to claim 9, wherein
    the second monotone image does not include an image of the selected identifier.

* * * * *